(12) United States Patent
Walley et al.

(10) Patent No.: US 8,838,060 B2
(45) Date of Patent: Sep. 16, 2014

(54) DEVICE COMMUNICATIONS VIA INTRA-BODY COMMUNICATION PATH

(75) Inventors: John Walley, Ladera Ranch, CA (US); Jeyhan Karaoguz, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 817 days.

(21) Appl. No.: 12/943,768

(22) Filed: Nov. 10, 2010

(65) Prior Publication Data

US 2011/0118030 A1    May 19, 2011

Related U.S. Application Data

(60) Provisional application No. 61/261,702, filed on Nov. 16, 2009.

(51) Int. Cl.
 *H04M 11/00*    (2006.01)
 *G06F 3/033*    (2013.01)
 *G06F 21/32*    (2013.01)

(52) U.S. Cl.
 CPC ............... *G06F 3/033* (2013.01); *G06F 21/32* (2013.01)
 USPC .......................................................... 455/403

(58) Field of Classification Search
 USPC ......... 455/556.1, 566, 411; 345/173, 90, 169, 345/156, 690, 684; 463/37; 273/247
 See application file for complete search history.

(56) References Cited

U.S. PATENT DOCUMENTS

| | | | |
|---|---|---|---|
| 2008/0318626 A1* | 12/2008 | Rofougaran | 455/556.1 |
| 2009/0009195 A1* | 1/2009 | Seguine | 324/690 |
| 2009/0258706 A1* | 10/2009 | Rofougaran et al. | 463/39 |

* cited by examiner

*Primary Examiner* — Kiet Doan
(74) *Attorney, Agent, or Firm* — Garlick & Markison; Randy W. Lacasse

(57) ABSTRACT

A communication device that may comprise one of a cell phone or a game controller system that further includes a game console and a pair of game controllers that communicate via a human body path. Generally, the communication device communicates by way of a touch pad array through a human body path using capacitive coupling in one embodiment of the invention. Encryption parameters and user contact information may be exchanged through the human body path. For example, a pre-shared key may be transmitted through the human body path to support subsequent encrypted wireless communications. The touch pad array may be a part of a display of the communication device but is not required to be so.

20 Claims, 15 Drawing Sheets

DEVICE COMMUNICATIONS VIA INTRA-BODY COMMUNICATION PATH

CROSS-REFERENCE TO RELATED APPLICATIONS

The present U.S. Utility patent application claims priority pursuant to 35 U.S.C. §119(e) to U.S. Provisional Application Ser. No. 61/261,702, entitled "TOUCH PAD USER IDENTIFICATION, GAMING INPUT, AND PREFERENCE INPUT," filed Nov. 16, 2009, which is hereby incorporated herein by reference in its entirety and made part of the present U.S. Utility patent application for all purposes.

BACKGROUND OF THE INVENTION

1. Field of the Invention

The present invention relates generally to electronic devices and more particularly to communications between devices.

2. Description of the Related Art

Many systems include paired devices that support communications in view of a desired result. For example, computers often are paired with printers and scanners, wireless headsets are paired with cell phones or landline phones, etc. Typically, such pairing occurs through an established protocol or set of connection procedures. Traditionally, communications to establish such pairing is by way of a wired or wireless communication medium.

Among other systems that have paired devices, user gaming devices are fairly well known. These devices include game consoles with communicatively coupled controllers such as Nintendo game consoles, Sony game consoles, Microsoft game consoles, and various other game console devices. These game consoles couple to a television, may couple to an audio system, and support user game playing. Some of these game consoles support wireless communications with handheld game controllers and/or other game controllers. For example, the Nintendo Wii includes handheld controllers that detect their orientation to some degree, acceleration to some degree, and receive standard button inputs from a user. This information is wirelessly relayed to the game console of the video game system to control operation of corresponding game elements within the gaming environment. Other game controllers may include simulated game devices such as musical instruments, baseball bats, golf clubs, and various other types of similar devices.

With the continued advancement of technology, the complexities and capabilities of game consoles have become advanced. The game controllers support sophisticated gaming inputs received via numerous input sources, e.g., buttons, accelerometers, IR orientation detectors, positional detectors, and various other gaming inputs to create game data. The gaming environment in which these gaming inputs are received is very complex, providing a realistic experience for a user of the gaming device/console. While some games supported by a game controller and/or console may receive only a few gaming inputs, other games require a large number of gaming inputs.

Game consoles support games that are software controlled. Sometimes game controllers are specific to the particular game being supported, e.g., Guitar Hero™, Rock Star™, and various other particular types of games. In such case, game controllers support specific types of inputs. The expense and complexity of the multiple game controllers can be overwhelming for some users from a cost standpoint.

The game controllers are typically battery controlled. Thus, battery life is often a major consideration with the game controllers, especially when a game being played requires multiple game controllers for a single player. Further, when the game being played requires multiple controllers, even when one of the game controllers has a wireless link to a game console, the other game controller typically includes a wired link to the first game controller. Such wired link between jointly used game controllers is inconvenient and can interfere with game motions. Additionally, communication devices are often paired with each other to exchange data. For example, a Bluetooth link may be used to transmit data from one cell phone to another.

BRIEF SUMMARY OF THE INVENTION

The present invention is directed to apparatus and methods of operation that are further described in the following Brief Description of the Drawings, the Detailed Description, and the claims. Other features and advantages of the present invention will become apparent from the following detailed description of the invention made with reference to the accompanying drawings.

DETAILED DESCRIPTION

Figure 1A:
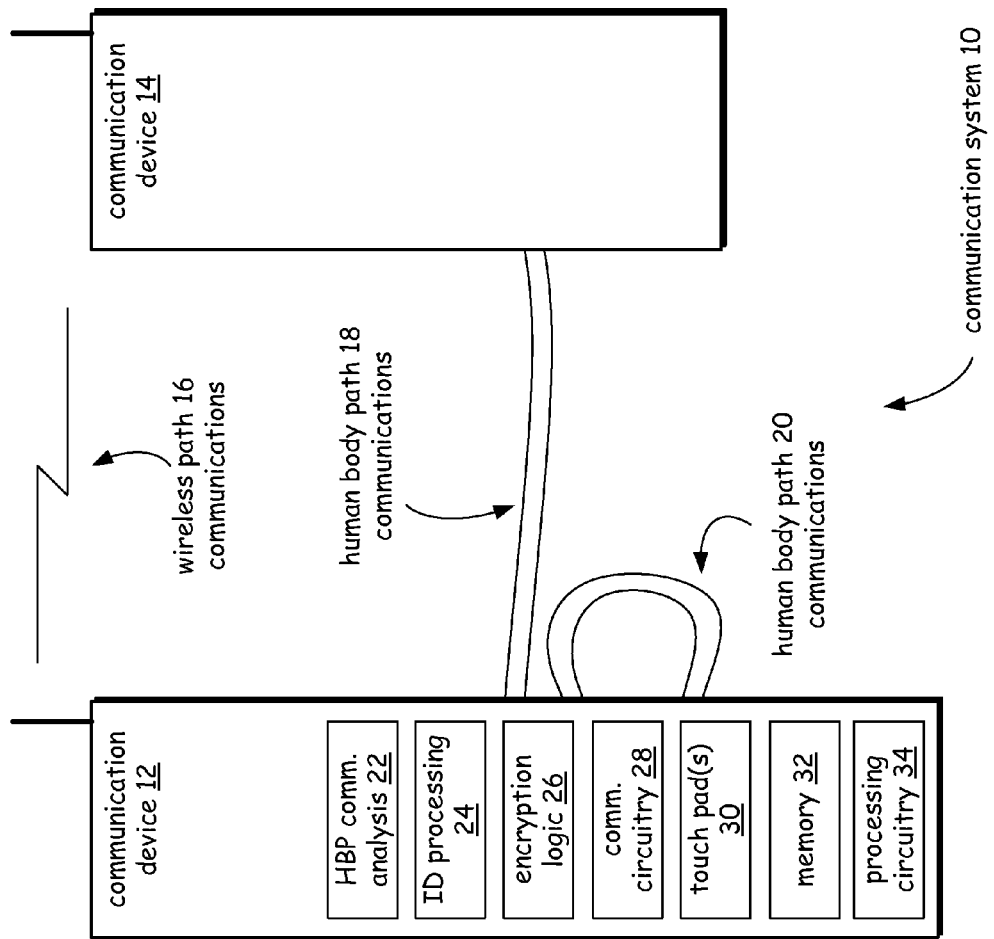
FIG. 1A is a system diagram illustrating a communication system constructed according to one or more embodiments of the present invention.

FIG. 1A is a system diagram illustrating a communication system constructed according to one or more embodiments of the present invention. A communication system 10 includes a first communication device 12 and a second communication device 14 that are operable to communicate via a human body path. The first and second communication devices 12 and 14 are configured to communicate by way of a wireless communication path 16 as well as human body paths 18 and 20. Communication devices 12 and 14 may be any one of a large number of devices having an ability to communicate. For example, a communication device may comprise a cell phone, a WLAN device, or a utility device such as a printer, oven, microwave oven, television, refrigerator, etc. that includes communication circuitry.

In the described embodiment of the invention, devices 12 and 14 are operable to utilize the human body path communications via human body paths 18 and/or 20 for purposes of identifying a person holding at least one of the communication devices 12 and 14, for purposes of supporting secure communications to support subsequent wireless secure communications (e.g., for secure encryption key sharing communications that occur through the human body path to enable subsequent secure wireless communications using the secure key established by way of the human body path communications) as well as for other routine communication purposes.

To illustrate such operations, devices 12 and 14 may initially communicate via human body path 18 to exchange or establish an encryption key for use in subsequent wireless path 16 communications utilizing a wireless communication channel. If, for example, devices 12 and 14 comprise two cell phones or two other communications devices operable to communicate using a personal area network communication protocol such as Bluetooth or an IEEE 802.11 based protocol, devices 12 and 14 may initially communicate via human body path 18 to exchange a pre-shared key to support the subsequent wireless communications. Alternatively, devices 12 and 14 may merely establish and then communicate via human body path 18 as long as the human body path 18 is present. For example, the human body path 18 may be used for communications as long as one user is holding both devices 12 and 14. In another example, if each device is being held by a different user, such a path may be present while the two individuals are touching (e.g., holding hands).

As may be seen, communication device 12 includes human body path communication analysis module 22, an ID processing module 24, an encryption logic module 26, and a communication circuitry 28. Further, device 12 includes one or more touch pad(s) 30 that are configured to transmit and or receive communication signals via the human body path as well as to sense a user's touch to identify a touch location. Touch pad(s) 30 may comprise any type of capacitive touch interface including but not limited to display devices having display screens and capacitive touch sensors that can detect a touch. Thus, touch pad(s) 30 utilize capacitive coupling for sensing a touch as well as for transmitting and receiving communication signals using capacitive coupling. In one embodiment, touch pads 30 may generate large voltage swings on a source side (e.g., 18 volts) as a source or carrier signal for communications and user identification as described herein. As will be shown in more detail below, the touch pad(s) may be arranged as a touch pad array.

Human body path communication analysis module 22 is operable to detect and/or measure specified communication parameters including but not limited to transmission propagation, impedance and/or conductance of the human communication body path of, for example, human body paths 18 and 20, optimum communication frequencies for the human communication body path and other similar characteristics that may uniquely identify a user. For example, human body path 20 may include a path through the index finger and the thumb of the same hand of a user. The detected or measured communication parameters may be used to uniquely identify a user. Thus, if a user is holding a communication device, a touch pad coupled to a thumb may communicate with a touch pad coupled to the index finger to determine the unique communication parameters that identify the user. Similarly, if the transmission signal characteristics are known for a transmission from communication device 14 for a signal transmitted through human body path 18, then HPB communication analysis module 22 is operable to detect and/or measure specified communication parameters for a user holding both devices 12 and 14.

Communication device 12 further includes ID processing module 24 that is operable to identify a user based upon the detected/measured parameters detected or measured by module 22. Encryption logic module 26 is configured to establish encryption parameters for wireless communications by way of wireless communication path 16 via communications over the human body path 18 (which may include a plurality of individuals that are touching to make a connection). For example, module 26 may include encryption key determination logic for determining or establishing a pre-shared encryption key (or key portion) for the subsequent wireless communications. Device 12 includes communication circuitry 28 that supports both human body path and wireless communications as described herein according to any one of a variety of communication formats or protocols.

As may also be seen, device 12 includes memory 32 that is configured to store data including user contact information that may be transmitted to or received from communication device 14. Processing circuitry 34 supports coordination and other general operations as well as the described operations. In one embodiment, communication devices 12 and 14 are operable to exchange contact information stored in memory 32 and to store received contact information in memory 32 when two users that are each holding one of devices 12 and 14 touch each other (e.g., shake hands) to create a human body path to support the exchange of contact information.

Figure 1B:
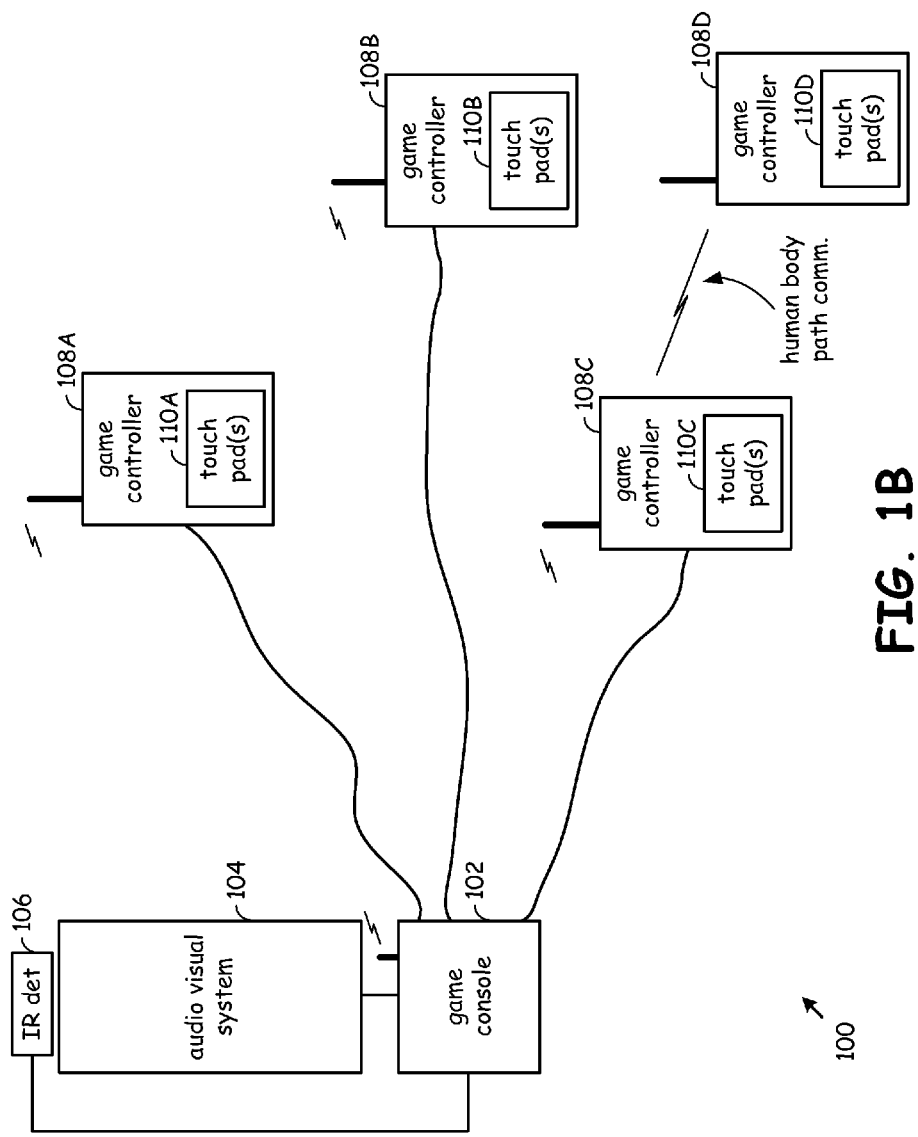
FIG. 1B is a system diagram illustrating a video game system constructed according to one or more embodiments of the present invention.

FIG. 1B is a system diagram illustrating a video game system constructed according to one or more embodiments of the present invention. The video game system 100 of FIG. 1B includes a game console 102 and a plurality of game controllers 108A, 108B, 108C and 108D. While not shown herein, the aspects described in relation to FIG. 1A may be included in the embodiments shown in FIG. 1B. The game console 102 couples to an audio/visual system 104 that includes a video monitor and an audio system. The game console 102 also couples to an infrared (IR) detector 106.

The game controllers 108A, 108B, and 108C communicate with the game console 102 via a communications interface that comprises one or more of wired and/or wireless communication links. The wired communication link may be to a tethered controller having conductors that support wired communications. Wireless communications may be in various RF frequency bands and/or in the infrared frequency range. Thus, each of the game controllers 108A, 108B, and 108C includes communication interface circuitry that allows the game controllers 108A, 108B, and 108C to communicate with the game console 102. Game controller 108D may have a similar configuration or may have a reduced functionality and associated configuration.

According to one or more embodiments of the present invention, each of game controllers 108A, 108B, 108C and 108D includes one or more touch sensitive pads/touch pads (referred to herein interchangeably) 110A, 110B, 110C and 110D, respectively. According to some aspects of the embodiments of the present invention, the touch pads of the game controllers 108A-108D are used to identify users of the game controllers, to provide gaming input, to determine whether a user is active, and/or to provide other information to the game console 102 for subsequent action. According to other aspects of the embodiments of the present invention, the touch pads may also generate signals for transmission by way of the human body path. Generally, the touch pads may comprise capacitive touch surfaces that may be used to transmit or receive communication signals via the human body path. In one embodiment, for example, the touch pads may all generate large voltage swings on a source side (e.g., 18 volts) as a source or carrier signal for communications and user identification as described herein. In an application for a game system as described here in FIG. 1B, the information or game data is transmitted by a game controller to the game console directly through a communication interface or indirectly via another controller (e.g., a primary controller).

Data captured by the touch pads may be solely processed by a host game controller, e.g., 108A, may be partially processed and transmitted to the game console 102 for further processing, or may be transferred in an unprocessed format from the game controller 108A to the game console 102. Based upon one or more embodiments of the present invention, touch pads are coupled to touch pad circuitry that measures capacitance (inductance or RF propagation) characteristics observed by a plurality of touch sensitive elements of the touch pads. Based upon the capacitive (inductance/RF propagation) information gathered from the touch pads, a user may be identified by game console 102 and/or game controller 108A, 108B, 108C or 108D.

The input received via the touch pads 110A, 110B, 110C, and 110D may be used for gaming input to the game console to modify operations of the game currently being supported by a game console to modify operation of the game currently being supported by a game console. According to another operation of the present invention, the input received via the touch pad 108A, 108B, 108C and 108D may be used to replace button functionality of previous generation game controllers. In such case, the touch pads may have a backlit display that provides representations of replaced buttons. According to various other operations of the present invention, the touch pads are calibrated to provide accurate input and/or altered in their operation to enact improved input operations.

According to another aspect of the embodiments of the invention, the video game system 100 of FIG. 1 comprises a primary game controller of the video game system that includes a communication interface for communicating with a game console over one of a wired or wireless communication medium as well as an intra-body communication module that is operable to transmit and receive communication signals via a human body path. In the described embodiment, controller 108C that includes touch pad 110C is configured to operate as a primary controller and further to communicate with a secondary controller 108D via the human body path. Secondary controller 108D also includes touch pads 110D.

To support such intra-body communications via the human body path, the primary controller includes at least one human body path communication sensor coupled to the intra-body communication module for transmitting and receiving communication signals via the human body path. Processing circuitry of the primary controller is coupled to the communication interface and to the intra-body communication module. The human body path communication sensor may be integrally formed into the controller or it may be a body-mounted human body path communication sensor (e.g., on a wrist band) that is tethered to the controller.

The processing circuitry is configured to receive communication signals transmitted via the human body path, transmit the communication signals via the communication interface, receive communication signals via the communication interface, and transmit the communication signals via the human body path. In the described embodiment, the primary controller is operable to communicate with a secondary controller via the human body path using the at least one human body path communication sensor.

Figure 2:
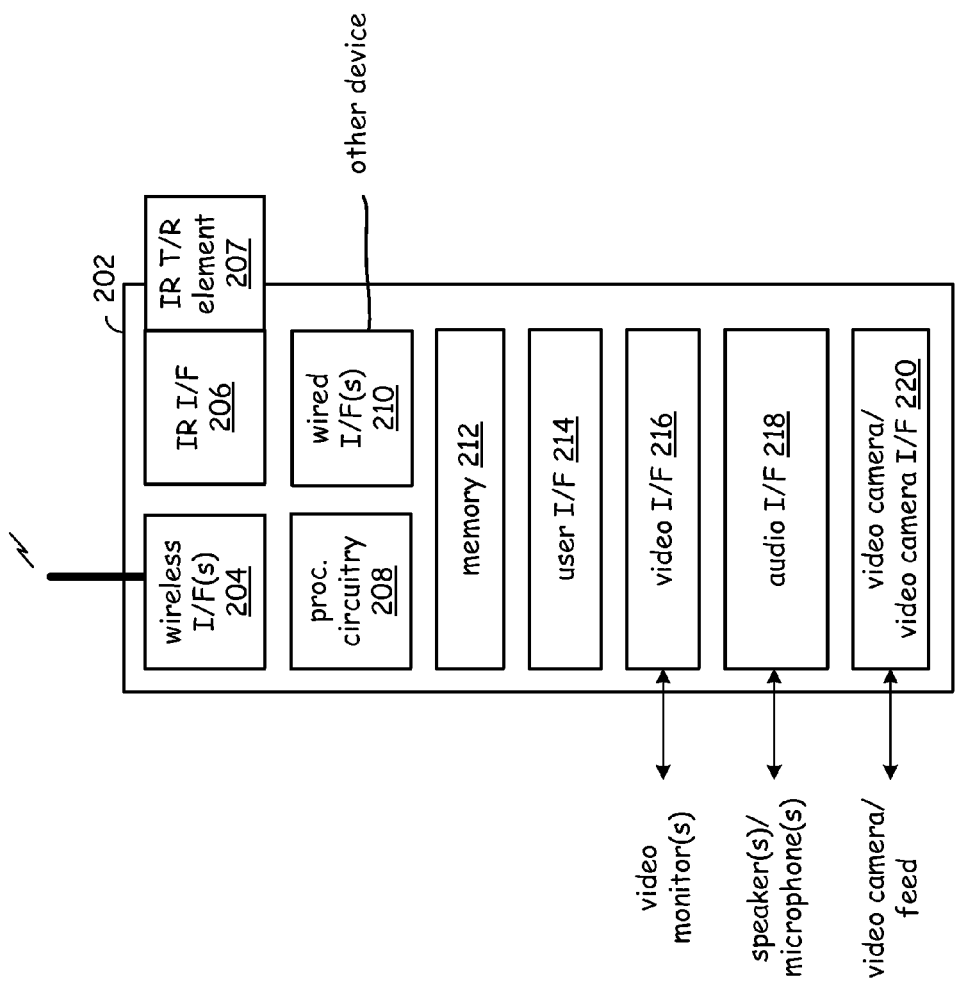
FIG. 2 is a block diagram illustrating a game console constructed according to one or more embodiments of the present invention.

FIG. 2 is a block diagram illustrating a game console constructed according to one or more embodiments of the present invention. The game console 202 of FIG. 2 includes a wireless interface(s) 204, an infrared interface 206, an IR Transmit/Receive element 207, processing circuitry 208, one or more wired interfaces 210, and memory 212. The game console 202 typically also includes a user interface 214, a video interface 216, an audio interface 218, and may include a video camera/video camera interface 220. The wireless interface(s) 204 supports wireless communications with at least the game controllers 108A, 108B, and 108C described with reference to FIG. 1. This wireless interface may be a Bluetooth interface, a wireless local area network (WLAN) interface, or another type of wireless communication interface that supports communications between the game console 202 and one or more game controllers. Further, the wireless interface 204 may support communications with a WLAN router or access point, a cellular infrastructure, a satellite communications network, or another type of wireless communications systems. Game console 202 may be the same as game console 102 or it may be differently configured.

The IR interface 206 couples to the IR transmit/receive element 207 and supports IR communications with game controllers 108A, 108B, and 108C as shown in FIG. 1. The IR communications between the game console 202 and the game controllers 108A, 108B, and 108C may support an industry standard or proprietary communications protocol. The processing circuitry 208 may include one or more of a system processor, a digital signal processor, a processing module, dedicated hardware, application specific integrated circuit, or other circuitry that is capable of executing software instructions and for processing data. The memory 212 may be RAM, ROM, FLASH RAM, FLASH ROM, an optical memory, magnetic memory, or other types of memory that is capable of storing data and/or instructions in allowing processing circuitry to access the same. The wired interface(s) 210 may include a USB interface, a fire wire interface, a serial interface, a parallel interface, an optical interface, or another type of interface supported by a media that is copper, metal, or optical.

The user interface 214 may include a keypad, a video display, cursor control, a touch pad, or other type of interface that allows a user to interface with the game console 202. The video interface 216 couples the game console 202 to one or more video monitors to provide display for the gaming environment supported by game console 202. The communications link between the video interface 216 and the video monitor(s) may be an HDMI interface, a composite video interface, component video interface, an S-video interface, or another type of video interface supported by both the video monitor and the game console 202. The audio interface 218 couples the game console 212 to speakers and/or microphones for audio content delivery and receipt. The video camera/video camera interface 202 may include an onboard video camera or may couple the game console 202 to an external video camera. The external video camera may be used to provide gaming input or other types of information that the game console 202 uses within its operation to produce a gaming environment.

Game console 202 is operable to receive instant acceleration information to determine whether a controller should be disabled. Game console 202 is further operable to receive at least partially processed identification information to identify the user of the controller. Finally, game console is further operable to compare the instant acceleration exceeds an acceleration threshold as a part of determining whether to disable the controller. Game console 202, if the user is known, is further operable to disable the controller in relation to the user. Further, in one embodiment, game console 202 is operable to store a plurality of acceleration thresholds in relation to at least one of a plurality of users, games, controller types, and game types.

Figure 3:
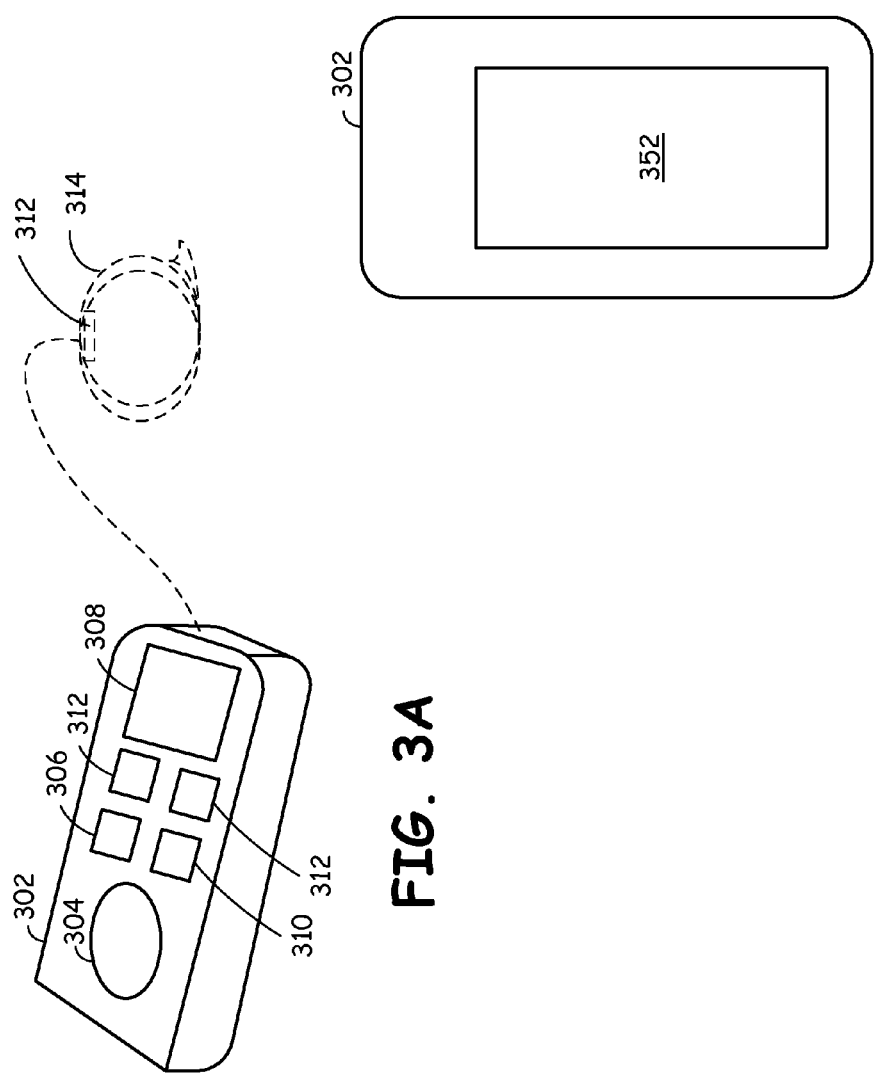
FIG. 3A is a first perspective view of a game controller constructed according to one or more embodiments of the present invention.
FIG. 3B is a second perspective view of the game controller of FIG. 3A that is constructed according to one or more embodiments of the present invention.

FIG. 3A is a first perspective view of a game controller constructed according to one or more embodiments of the present invention. As shown in FIG. 3A, a game controller 302 includes a cursor control 304, mechanical buttons 306 and 310, and may include a touch pad 308. The cursor control 304 may be a touch pad also. When 304 and 308 are both touch pads, they receive inputs and may be used for user identification, gaming input, or other operations supported by the gaming system and includes game controller 302. As may further be seen, controller 302 includes one or more human body path communication sensors 312 that support intra-body communications using any one of a plurality of techniques known by those of average skill in the art including capacitive type coupling (in which two human body path communication sensors 312 are typically utilized) and galvanic/waveguide type coupling (in which at least one human body path communication sensor 312 is typically utilized) for intra-body communications. The galvanic coupling technique does not require a return path or a common reference since it employs an electromagnetic waveguide propagation type of communication technique. In contrast, capacitive coupling techniques typically require two human body path communication sensors wherein one is coupled to ground or circuit common. As may further be seen, a human body path communication sensor 312 may also comprise a body mounted human body path communication sensor such as the human body path communication sensor 312 that is supported by wrist strap 314 (shown in dashed lines to represent an optional or alternative embodiment). The body-mounted human body path communication sensor is coupled to controller 302 via a tethered connection as shown.

FIG. 3B is a second perspective view of the game controller 302 of FIG. 3A that is constructed according to one or more embodiments of the present invention. As shown in FIG. 3B, a reverse portion of the game controller 302 may include a touch pad 352. The touch pad 352 may wrap around a back portion of the game controller 302. Alternatively, the touch pad 352 may reside on a battery cover of the game controller 302. As will be described further herein, the touch pad 352 includes a plurality of touch pad locations/touch sensitive elements that receive input that may be further used for user ID, gaming input, and/or other purposes.

Figure 4:
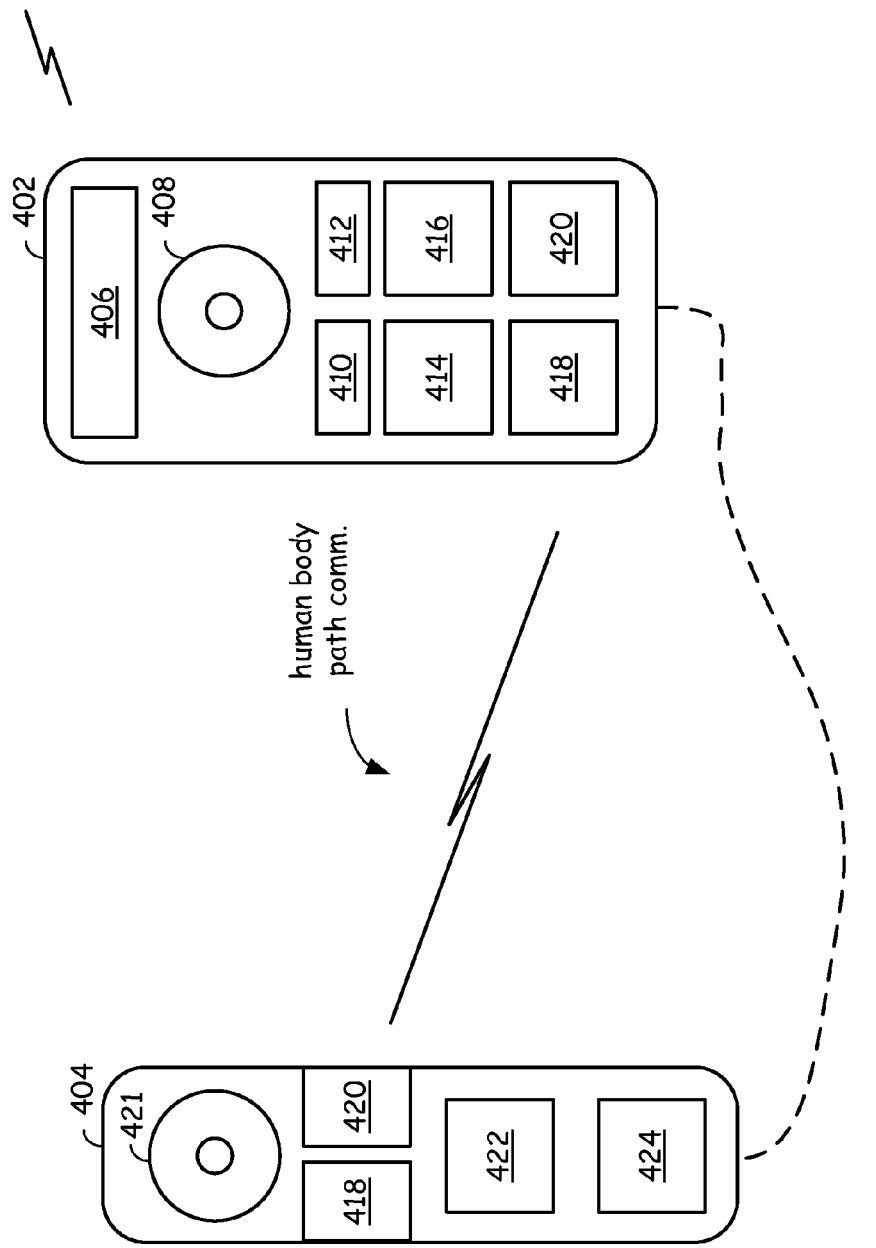
FIG. 4 is a block diagram illustrating a game controller and coupled secondary game controller, both of which are constructed according to one or more embodiments of the present invention.

FIG. 4 is a block diagram illustrating a game controller and coupled secondary game controller, both of which are constructed according to one or more embodiments of the present invention. As shown in FIG. 4, primary game controller 402 includes a display 406, a circular input device 408, and button inputs 410, 412, 414 and 416. Any of these input devices 408, 410, 412, 414 and 416 of primary game controller 402 may be touch pads, as is further described herein. These touch pads receive gaming input in a manner that is consistent with mechanical counterparts that were previously implemented according to prior devices. Further these touch pads may receive input that is used to identify a user or to provide other information. Further, human body path communication sensors 418 and 420 are included to support communication via the human body path.

The primary game controller 402 couples to secondary game controller 404 via either a wired or a wireless interface. One aspect of the embodiments of the present invention is that this coupling may comprise communications via a human body path. The secondary game controller 404 includes input components 421, 422, and 424 as well as human body path communication sensors 418 and 420. These input components 421-424 of the secondary game controller 404 may comprise either mechanical input devices or touch pads. The manner in which touch pads are implemented is described further herein. Data collected from these input components 421, 422, and 424 are relayed to game controller 402 via the human body path, which may process the inputs. Alternately, the input received from input components 421, 422, and/or 424 may be relayed to a servicing game console. The primary game controller 402 and the secondary game controller 404 may both be hand-held devices. Alternately, one or the other of these game controllers may be placed on the floor, inserted into a simulated gaming piece, e.g., guitar, drums, simulated golf club, simulated baseball bat, etc. Each of these game controllers 402 and 404 may capture touch pad input as is further described herein with reference to the FIGs. The touch pad input captured by game controllers 402 and 404 may be processed to produce combined gaming input (game data) or transmitted separately to a game console 202. The combined or separate touch pad input may be used as gaming input, may be processed to identify a user, or may be processed to otherwise provide input to a supported video game. As may also be seen, a tethered connection may be used optionally if the human body path communications are inadequate for a particular application.

Figure 5:
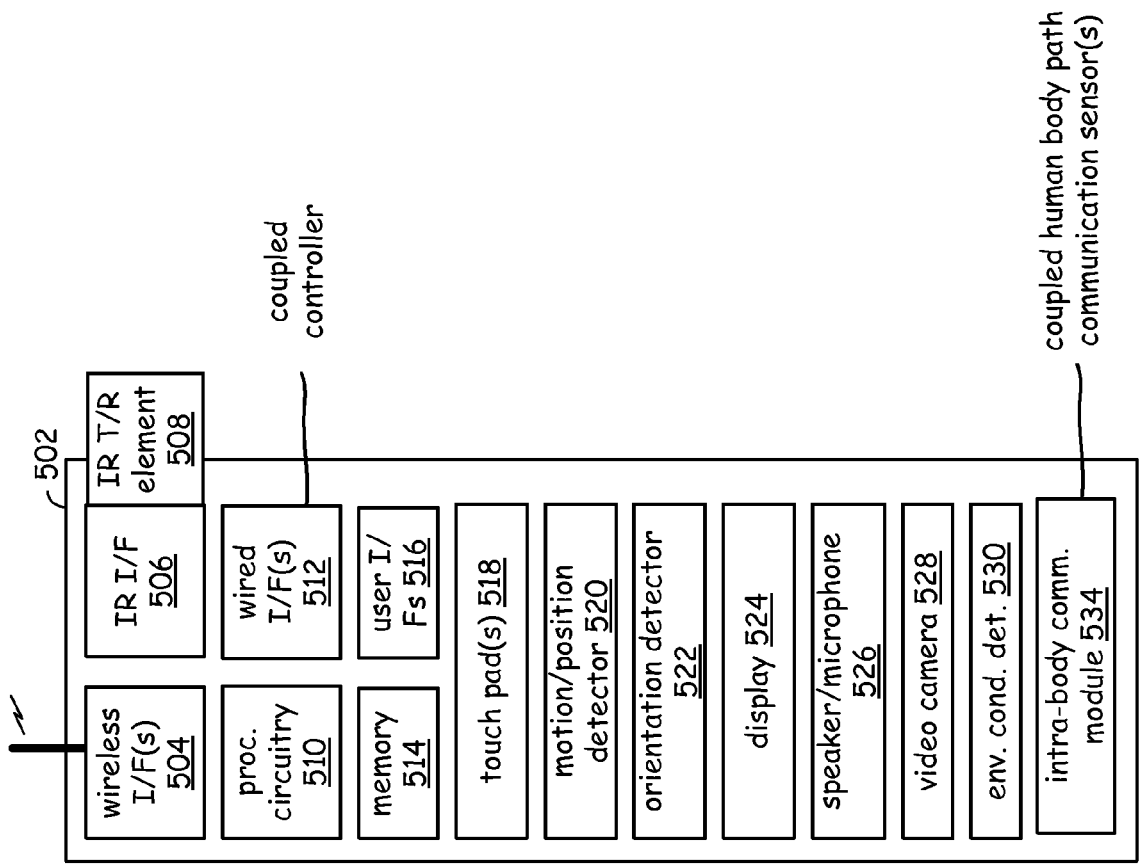
FIG. 5 is a block diagram illustrating a game controller constructed according to one or more embodiments of the present invention.

FIG. 5 is a block diagram illustrating a game controller constructed according to one or more embodiments of the present invention. The game controller 502 includes one or more wireless interfaces 504, an IR interface 506 that includes an IR transmit/receive element 508, processing circuitry 510, wired interface(s) 512, memory 514, and user interface(s) 516. These particular components of the game controller 502 may be similar to the like named components of the game console 302 illustrated in FIG. 2 and described with reference thereto. However, in other embodiments, these like named components may have differing construct/functionality, e.g., smaller memory, less processing capability, lower power wireless interfaces, etc. Thus, commonly named components will not be described further herein as they have been previously described with reference to FIG. 2.

The game controller 502 includes one or more touch pad(s) 518, motion/position detector 520, orientation detector 522, display 524, speaker/microphone 526, and a video camera 528. The game controller may also include other components such as one or more environmental conditions detectors 530 that are used to sense environmental conditions such as temperature, humidity, and other environmental conditions. The game controller 502 includes an intra-body communication module 534 that supports human body path communications with another device such as another similarly equipped game controller. Module 534 is configured to generate communication signals having transmission characteristics according to a desired format and protocol for effective transmission through the human body path. For example, in one embodiment, module 534 generates and receives time division multiple access communication signals using either a binary phase shift keying or a quadrature phase shift-keying modulation. Moreover, module 534 generates power transmission levels that are minimal for human body path communications and are typically lower than transmission power levels for wireless transmissions via the communication interface.

The structure and operations of the touch pads 518 will be described further herein with reference to subsequent figures. The motion/position detector 520 detects motion/acceleration of the game controller 502. Detection of such motion/acceleration may be performed in conjunction with the game controller, using a GPS system, using an accelerometer or gyrator of the game controller 502 and/or using external components to determine motion/acceleration position of the game controller. The motion/position detector 520 may also determine position of the game controller. The manner in which the motion/position detector 520 determines the position of the game controller 502 is not described further herein. However, the position detector 520 may use external reference devices in order to determine position of the game controller within a gaming environment. Motion, acceleration, and position of the game controller 502 may be provided to a servicing game console as a gaming input (as referenced herein as game data).

The orientation detector 522 determines an orientation and/or direction in which the game controller is pointed. Such orientation detection provided by orientation detector 522 may be accomplished in conjunction with the IR interface 506 of the game controller 502. Such orientation detection may be performed in conjunction with the IR detector 106 of the gaming system 100 of FIG. 1.

The display 524 of the game controller 502 may have a relatively small size or relatively large size that presents information to a user and that allows the user to respond accordingly. The speaker/microphone 526 may receive audio input and provide audio output to a user of the game controller 502. Audio input captured by the microphone may be used in conjunction with touch pad 518 inputs for user identification and/or for gaming input. Video camera 528 of the game controller may be used to determine a location of the game controller and/or may be used to provide additional gaming input for gaming environments supported by the game controller 502.

According to one particular aspect of the video game system of FIG. 1, the touch pad(s) 518 of the game controller 502 (and/or game console) may be capacitive, inductive, or RF based. With regard to inputs received via the touch pad of the game controller, the raw data received by a touch pad of the game controller may be fully communicated to the game console of the gaming system. Alternatively, information captured via the touch pad(s) 518 of the game controller may be processed by the processing circuitry 510 of the game controller 502 (or other processing circuitry such as touch pad processing circuitry, which may be different or the same as the processing circuitry 510) prior to communicating such information to the game console 102 of FIG. 1. Such processing may be full or partial to determine whether and what data to upload to the game console.

Referring again to FIG. 4, the touch pad input received by game controller may be received at both primary 402 and secondary 404 game controllers of FIG. 4. The input received from multiple touch pads of the primary and secondary game controllers 402 and 404 may be received and at least partially processed by processing circuitry of the game controller(s) prior to uploading the data to a game console.

The touch pad input processing may be based upon a current usage of the game controllers. For example, the primary game controller 402 may be relevant to a first portion of a user's body while the secondary game controller 404 may be relevant to a second portion of a user's body. In one particular example, teachings of the present invention apply touch pad operations to an input device that receives data corresponding to one or more feet of a user, e.g., secondary controller 404 is a footpad. In such case, a foot pattern of a user may be employed to identify the user or to receive gaming input from the user within the gaming system.

The data received from one or more touch pads according to the present invention may be used to identify a user of the gaming system. Data captured by one or more touch sensitive pads or panels is used to distinguish a user from a plurality of users based upon finger width, finger length, finger spacing, knuckle joint location, finger angle, and other characteristics of a user's hand/fingers that is used to grasp the game controller. Identification of the user is done based upon pattern matching using various techniques, some of which are known. Further, the touch pad and related operations supported by the structures of the present invention may identify users based upon the heat transfer characteristics, their pulse rate characteristics, and other characteristics that would be gathered via input at a touch pad.

In establishing user characteristic/user ID correspondence, there may be multiple levels of training. With one level of training, a user sets-up his or her identity within the video game system. Then, a first operation establishes correspondence between touch pad characteristics and the user. The video game system may query a user to confirm that he or she is currently using the game controller with this operation by receiving input from a touch pad and then confirming that the particular user identity is correct. Further, the training may proceed so that it is initially intrusive and asks a number of questions of the user but then decreases its intrusions when matching stored users with touch pad input characteristics.

Alternatively, the game controller may simply automatically relate user characteristics as received from a touch pad with game characteristics or settings of the gaming system. Generally, the user identification learning process should be as automatic as possible so as not to be burdensome to users of the system. Further, the user identification system of the present invention should delete inactive users from the database so that they are not considered as candidates when determining whether or not a current user is one of a plurality of registered or prior users of a system.

According to another aspect of the present invention, the touch pad input that is used to identify the user may be used in conjunction with auxiliary information to identify a particular user. This auxiliary information may include game usage levels, game selections, time of day at which game is performed, day of week at which game is performed, gyrator input (accelerometer input), coupled secondary gaming devices or service devices, and/or additional auxiliary information. For example, one particular user may select generally games A, B and C while another user may select generally games C, D, and E. Based upon a particular game selection and data input received from a touch pad, the auxiliary information of game selection may be used to further identify the user that is currently using the gaming system. Moreover, a particular user may only use the system during certain times of the day or days of the week and such information is further used to determine identity of the user of the gaming system. Moreover, some users may only use certain auxiliary devices such as nun chucks, guitars, drums, car driving accessories, plane control accessories, or other coupled devices of the game controllers. In such case, the operations of the present invention may use the fact that these devices are coupled to further limit the number of potential users that are considered for identification at a particular time.

Once a user is identified, a user ID is employed to enact a user's custom settings for the gaming system. For example, a particular user is identified and this user's game selection, game settings, and other preferences that have been previously inputted into the game system are automatically enacted. According to another aspect of the present invention, once a user is identified, the gaming environment settings are altered based upon such identification. For example, once the user is identified, the game difficulty level, game entry point, game controller button functions, game controller touch sensitive panel/touch pad gaming input functions, and/or other custom settings of the gaming system may be altered.

In one particular example, once a user is identified, a sequence of touches on the touch pad may alter some game operation or game selection operations. These particular custom operations are based upon the fact that a particular user is identified as currently operating the gaming system. Further, menus and other user input selections may be altered after a user is identified. For example, the user may have previously indicated that he or she only wants to employ certain games. Once that user is identified then the gaming system would only give that particular user the option of selecting from a list of previously selected games. Further, the user may have customized the menu of the gaming system previously. When the user identified them the customized user interface of the gaming system is enacted.

According to another aspect of the present invention, the touch pad is operable to determine a relative hand position of the user of the game controller. For example, some types of video games such as tennis or golf require that a user hold the game controller at a particular position. While other games require that the user holds the game controller at a differing position. According to one aspect of the present invention, the game controller and/or the game console is able to determine what position that the user is holding on the game controller. Once this position is identified, the game controller/game console is able to limit the types of games that the user may play based upon the position of the hand with regard to the position of the controller. Thus, the game is customized to some degree based upon a hand position of the user with respect to the controller.

According to another aspect of the present invention, input received via touch sensitive pads or panels may be used for gaming input. For example, the touch pads may be used to determine that a user has changed his or her hand or finger positions, changed his or her grip positions or otherwise abruptly changed an input to a game controller that is used within a gaming system. Such detection may be used with one scanning rate of the touch pad. Alternatively, the scanning rate of the touch pad may be altered based upon a game being played. For example, when the game being played is one that has minimal input requirements the scanning rate may be relatively lower. However, when a game is being played that has a relatively higher input rate such as a fitness program, the scanning rate of one or more touch pads of one or more game controllers may be increased. Further, scanning of one or more of the touch pads may be enabled for some portions of the game while not enabled for another portion of the game. For example, grip/finger position movement or pressure changes may be enabled during a first portion of the game and not enabled for other portions of the game. Such is the case because the particular gaming input that is being sensed by changing finger position or grip pressure is only relevant during some portions of the game and not others.

The gaming input may be based upon a change from a prior hand position or a prior relationship between the hand and the game controller and a current position of the hand with respect to the game controller. For example, also, a baseline position for the hand with respect to the game controller may be established during a baseline mode of operation. Then, any alteration of the position of the hand with respect to the game controller will serve as a differing gaming input while operation of the game progresses.

Further, the game console based upon a game being played may reconfigure each of a plurality of touch sensitive pads of the game controller. Because each game being played may have particular gaming input requirements, the configuration of the touch pad may be required to be customized for the particular game being played so that the gaming input is most relevant to the particular game. For example, a game in which the touch pad provides multiple types of input to the game may require a configuration of the touch pad other than when the game controller touch pad only indicates whether the user has picked up the game controller. Further, configuration of the touch pads may be selected by user based upon the gaming parameters. For example, the configuration of the gaming panels may change a particular game point based upon a selection of the user.

Moreover, configuration of touch pad functions may be based upon the orientation of a controller. For example, when a golf, baseball, tennis, or sword input is selected, the touch pad functions may differ for each of the particular types of games. Such is the case because the game controller may be held in different relative positions with respect to the hands for each of these types of games. Thus, the manner in which the touch pads provide gaming input will change based upon not only orientation of the controller but with regard to its simulated game piece function.

Further, each particular game may have its own particular touch input language that implements particular game function(s). Such game touch input language may be considered as a sequence of touches with the touches in particular portions of the touch pad providing input to the game. The sequence of touches provided to the touch pad is similar to those that may be provided via sequence of button selections via mechanical buttons of the prior game controller. However, because the touch pad of the present invention game controller is very configurable and not limited by mechanical button limitations, the touch pad may be configured at different points in time to have particular touch sequence input functions.

Figure 6:
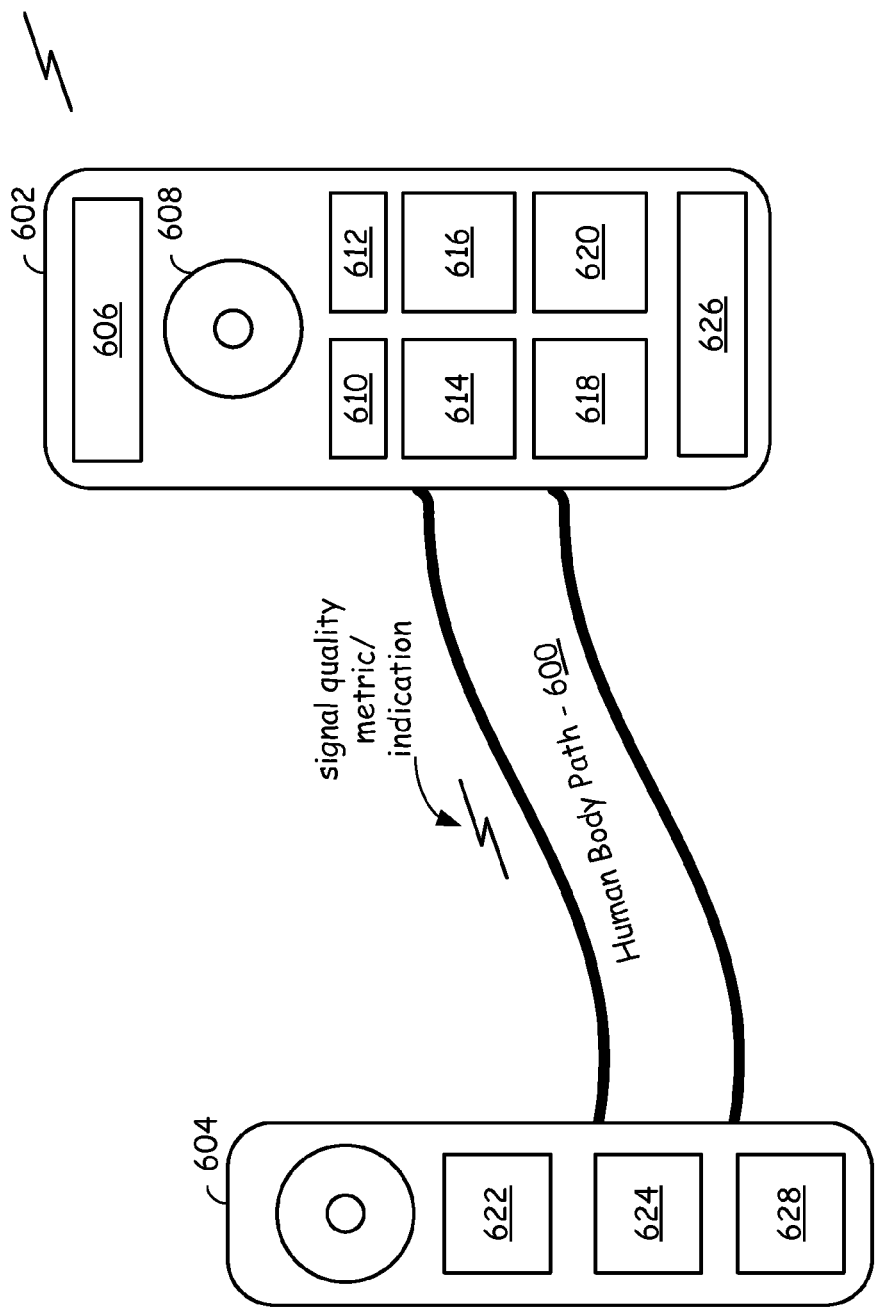
FIG. 6 is a diagram illustrating primary and secondary game controllers that communicate via a human body path according to one or more embodiments of the present invention.

FIG. 6 is a diagram illustrating primary and secondary game controllers that communicate via a human body path according to one or more embodiments of the present invention. As shown in FIG. 6, the primary game controller 602 and secondary game controller 604 communicate via a low power communication format being utilized for human both path communications. For example, if a capacitive coupling technique is utilized in which a human body path communication sensor is coupled to circuit common or ground, somewhat resembling a wired communication technique, the power level is still reduced since the human body is acting conductive medium in place of a wired medium. If galvanic coupling is utilized, in which a coupling to a return path (e.g., circuit common or ground) is not required, the pulsed communication is also at a low power level.

With the embodiment of FIG. 6, each of the primary and secondary game controllers 602 and 604 includes a module and/or circuitry to include a human body path 600 as a communication mechanism. More specifically, each game controller includes a communication module for human body path communications that define the communication signal formats that are being implemented for the human body path communications. Such communication body path 600 may be a lower power than would be otherwise required by a wireless link between devices 602 and 604. Controllers 602 and 604 further include communication human body path communication sensors that support the implemented intra-body communication technique such as capacitive coupling or galvanic coupling as described in relation to FIG. 1. It should be understood that the intra-body communication techniques are not limited to these techniques. Any known intra-body communication technique may be utilized in conjunction with the teachings of the embodiments of the present invention.

Further, the controllers 602 and 604 may become coupled upon determining that the human body path 600 couples to primary game controller 602 and secondary game controller 604. In such case, these controllers would not be enabled as a pair unless the controllers detected the human body path 600. Further, the human body path 600 characteristics could be further used to identify a user that is holding the primary game controller 602 and secondary game controller 604.

Another aspect of the embodiment of FIG. 6 is that the primary game controller 602 serves as a communication path between both of the game controllers 602 and 604 and a game console. In this fashion, the secondary game controller 604 communicates with the primary game controller 602 via the human body path to exchange data thereby. Then, information that is intended for the game console is passed by from game controller 602 to game console.

In one embodiment, a feedback signal is utilized to adjust transmission power levels through the human body path as a part of a power control scheme. Such a feedback signal may specify whether a signal quality is satisfactory or it may include a signal quality metric such as a signal to noise ratio. Thus, in such an embodiment, the primary and secondary controllers exchange signal quality indications to find a lowest possible transmission power level that has acceptable signal quality characteristics.

Figure 7:
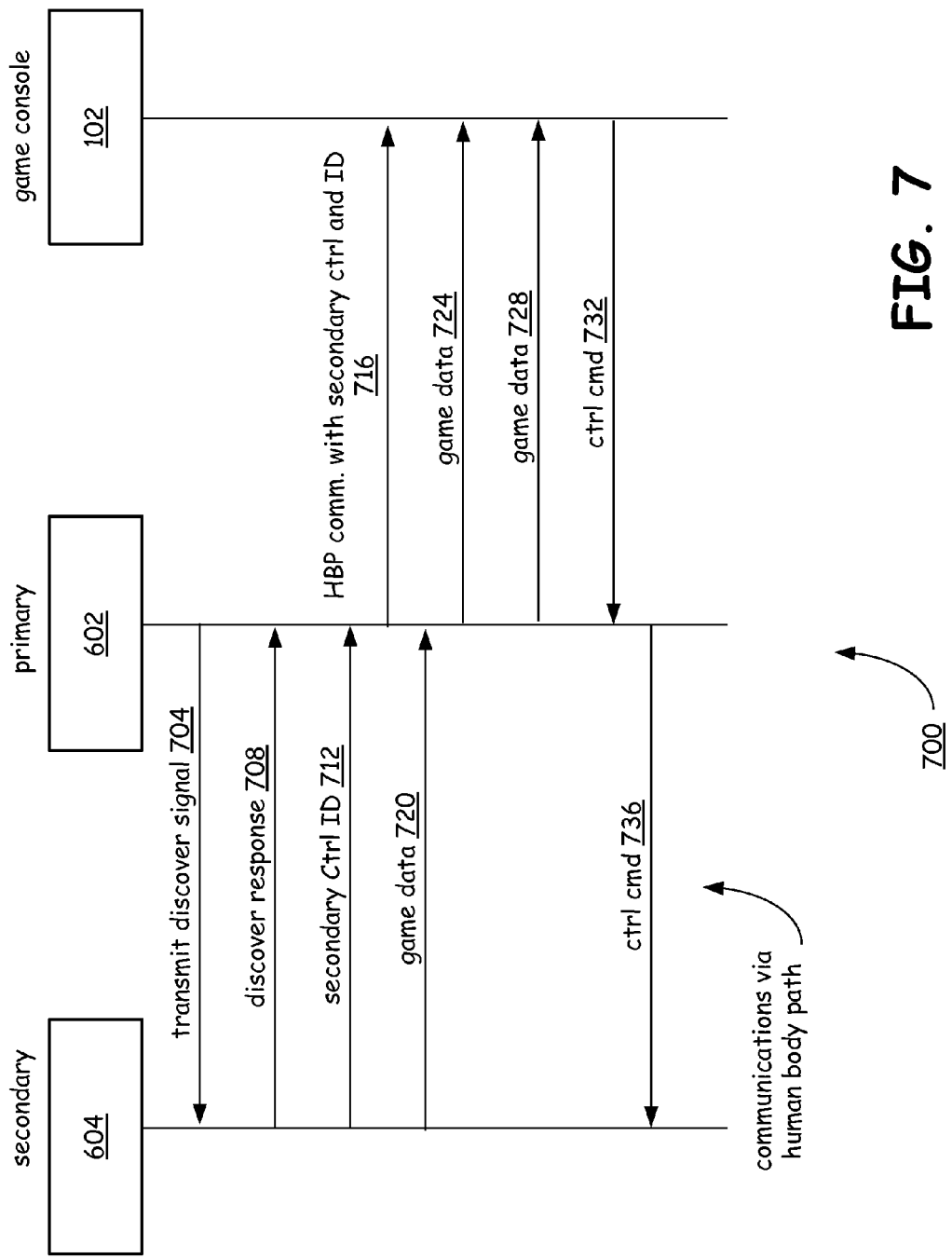
FIG. 7 is a signal sequence diagram that illustrates an embodiment for game controller system and associated communications.

FIG. 7 is a signal sequence diagram that illustrates an embodiment for a game controller system and associated communications. Referring to FIG. 7, one aspect of communications via the human body path is shown generally at 700. A controller, e.g., primary controller 602, generates a discover signal 704 to secondary controller 604. The discover signal 704 is transmitted through the human body path. It should be understood that secondary controller 604 may transmit discover signals 704 instead of primary controller 602. Here, secondary controller 604 then transmits a discover response 708 to primary controller 602 via the human body path. As a part of response 708, or as shown, as a separate transmission, secondary controller 604 transmits a secondary controller ID 712 via the human body path.

Thereafter, primary controller 602 transmits via a traditional wired or wireless medium through a communication interface an indication 716 to the game console 102 that controllers 602 and 604 have an established communication link via the human body path. Primary controller 602 includes the ID of the secondary controller in transmission 716 in one embodiment of the invention. The indication that a human body path communication has been established may be in the form of an explicit signal whose assertion represents such communication. Alternatively, such indication may be implicit such something that may be inferred when the primary controller 602 produces an ID of secondary controller 604 to game console 102.

In one embodiment, game console 102 operates controllers 602 and 604 as a pair in relation to a program, game, or application. Thereafter, secondary controller 604 transmits game data 720 to primary controller 602 via the human body path. Controller 602 then transmits the receive game data 724 via one of a wired or wireless communication link to game console 102. Additionally, controller 602 also transmits its own game data 728 to game console 102. Alternatively, the game data for both controllers may be transmitted jointly to game console 102. Finally, as may be seen, game console 102 transmits a control command 732 to primary controller 602. In the described example, control commands 732 are to be delivered to controller 604. Accordingly, primary controller 602 transmits the control command 736 to secondary controller 604 via the human body path.

Known addressing schemes and transmission formats may be used to identify the destination of the control commands 732. If the control command 732 includes an address of primary controller 602, the controller 602 processes and responds to control command 732 in an appropriate manner. If an included address is that of controller 604, then controller 602 generates signal 736 to forward the control command. If control command includes addresses for both controllers 602 and 604 or an indication that the control command is for both (e.g., a "broadcast" transmission format or indication), the controller 602 processes and forwards control command 732.

Figure 8:
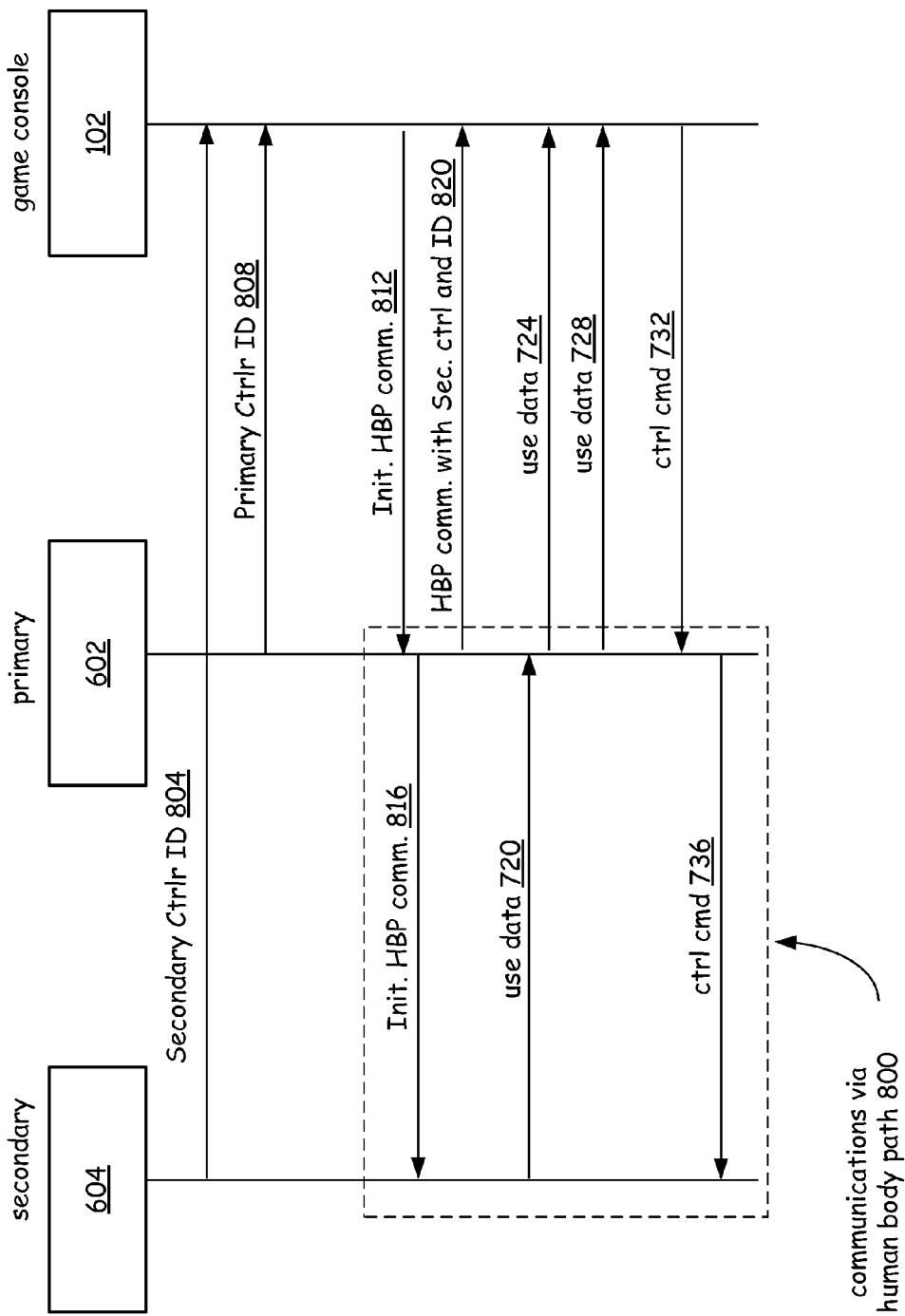
FIG. 8 is a signal sequence diagram that illustrates another embodiment for game controller system and associated communications.

FIG. 8 is a signal sequence diagram that illustrates another embodiment for a game controller system and associated communications. Many of the signal flows in FIG. 8 for communications via the human body path shown generally at 800 are similar to those of FIG. 7. Similar signals are numbered the same and will not be discussed here. Referring to FIG. 8, a controller, e.g., secondary controller 604, transmits a user ID of a user holding secondary controller 604 in a signal 804 to game console 102 through a communication interface using a traditional wired or wireless communication media (e.g., Bluetooth or IEEE 802.11 communication protocol wireless communications). Similarly, primary controller 602 transmits a user ID of a user holding primary controller 602 in a signal 808 to game console 102 using a traditional wired or wireless communication media.

Game console 102, after receiving the user IDs for controllers 602 and 604, is operable to determine, by comparing the user IDs, that the same user is holding both controllers. Additionally, either based upon a received ID of the controllers 602 and 604 or based upon stored information, game console 102 is operable to determine that the two controllers 602 and 604 are capable of human body path communications. Accordingly, game console 102 generates a control command 812 to prompt controllers 602 and 604 to establish human body path communications. Specifically, game console 102 transmits an Initiate Human Body Path communications command 812. Primary controller 602, upon receiving command 812 initiates a human body path communications 816 with secondary controller 604. Specifically, controller 602 transmits a discover signal 704 and receives a discover response 708 to establish the human body path communications. In another embodiment, game console commands both controllers 602 and 604 to establish human body path communications by sending a command to each through traditional wired or wireless communications.

Once a human body path communication link is established, primary controller 602 transmits via a traditional wired or wireless medium an indication 820 to the game console 102 that controllers 602 and 604 have an established communication link via the human body path. Primary controller 602 includes the ID of the secondary controller in indication 820 in one embodiment. Thereafter, communications 720-736 may occur as described above. In one embodiment, game console 102 operates to pair controllers 602 and 604 for operation in relation to a program, game, or application.

Figure 9:
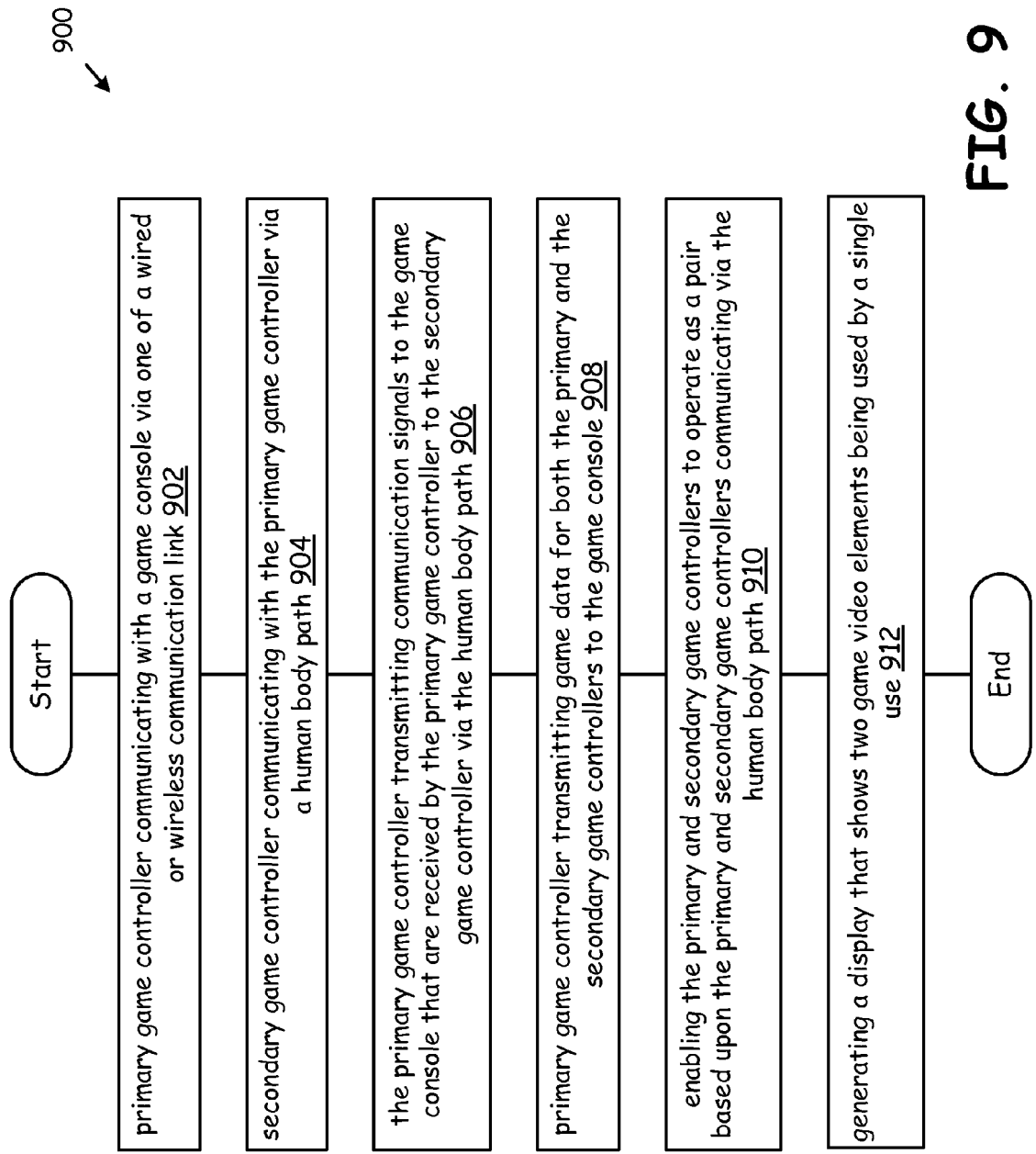
FIGS. 9-11 are flow charts that illustrate various embodiments for a method of game controller communications.
Figure 10:
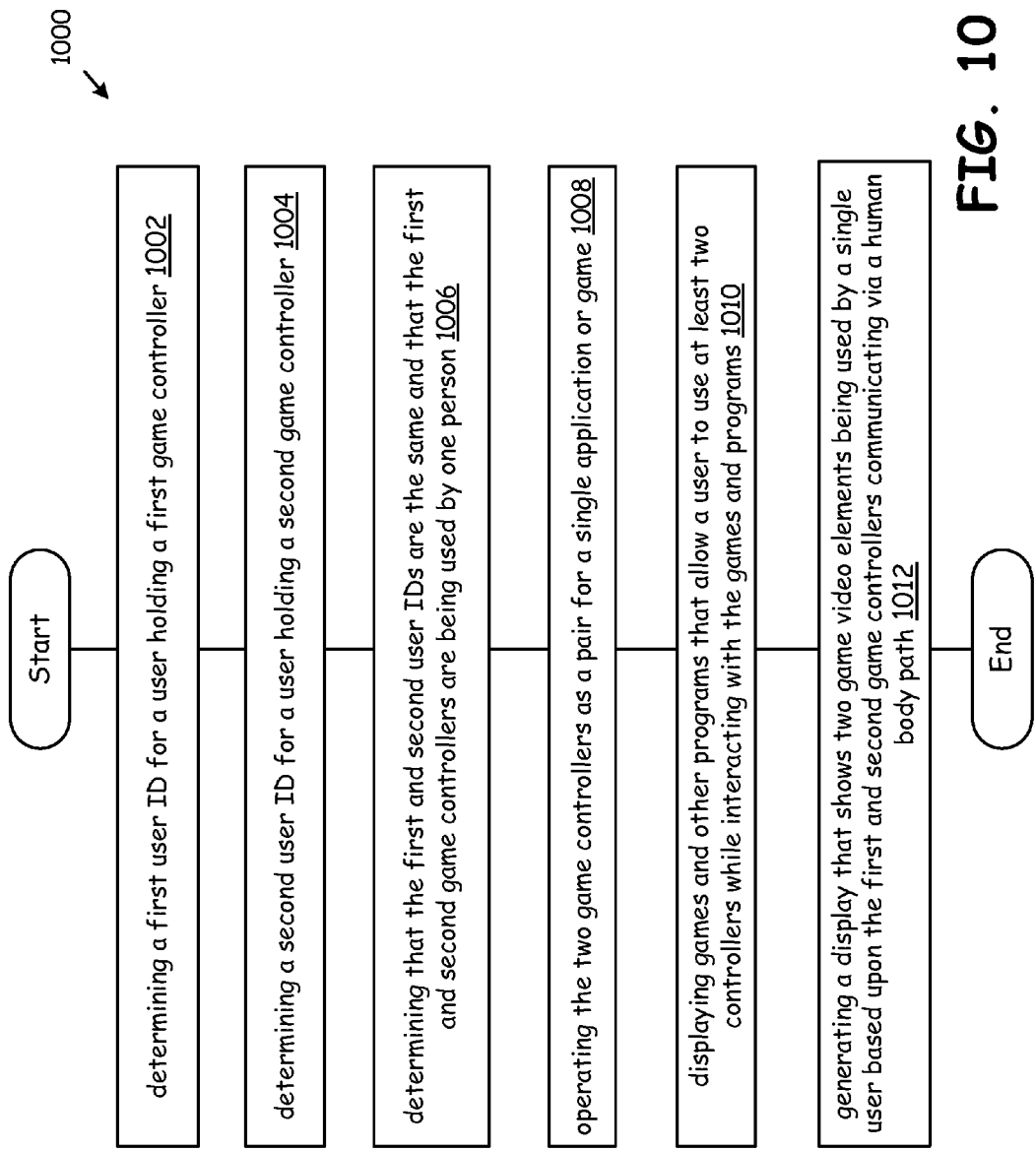
Figure 11:
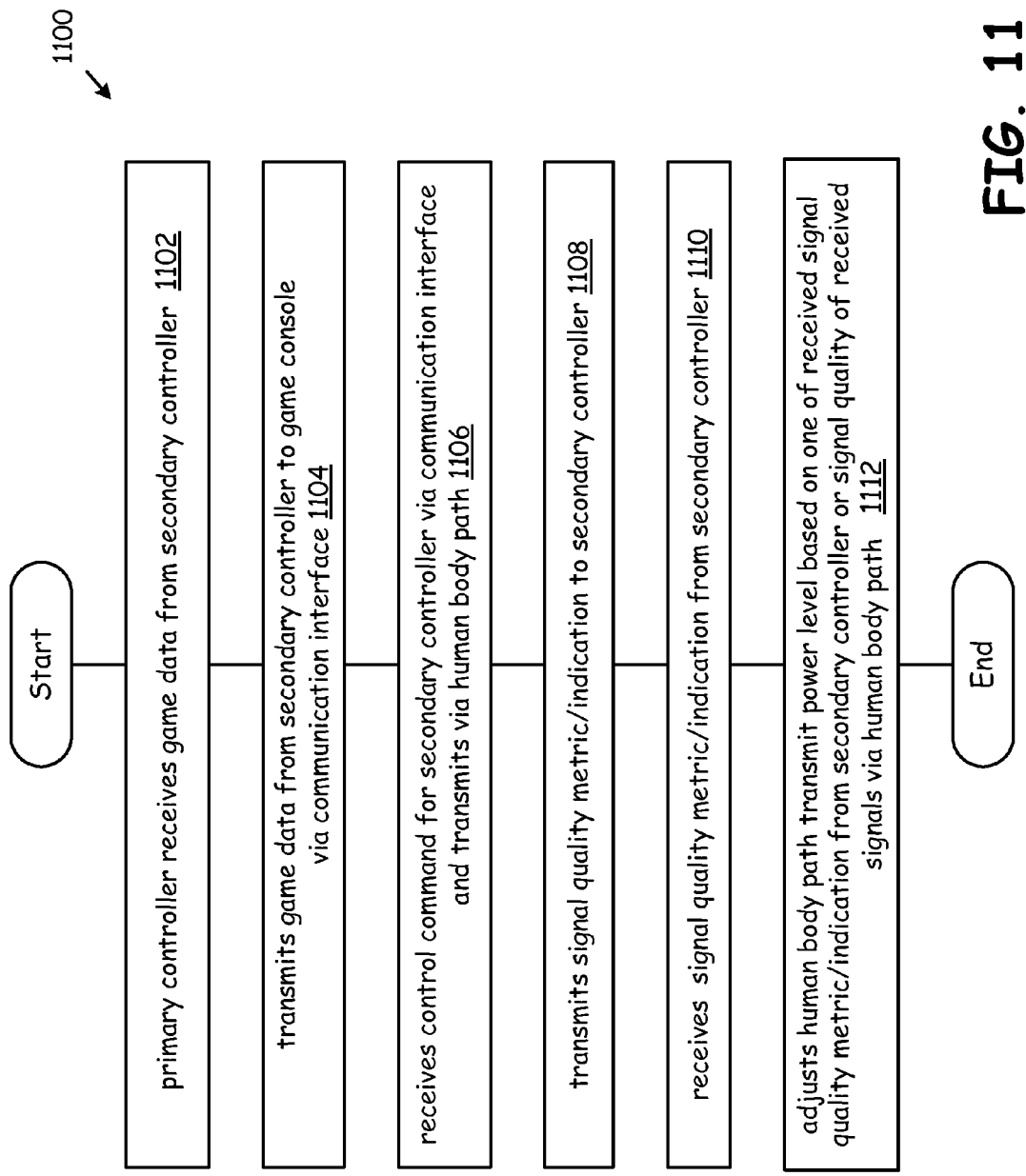

FIGS. 9-11 are flow charts that illustrate various embodiments for a method of game controller communications. Referring to FIG. 9, a method for a video game system includes a primary game controller communicating with a game console via one of a wired or wireless communication link, Step 902, and a secondary game controller communicating with the primary game controller via a human body path, Step 904.

The method further includes the primary game controller transmitting communication signals to the game console that are received by the primary game controller to the secondary game controller via the human body path, Step 906. The method may further include the primary game controller transmitting game data signals for both the primary and the secondary game controllers to the game console, Step 908.

In the above-described embodiments, typically one person is using two controllers. Accordingly, the method includes operating the primary and secondary game controllers as a pair for a single application (e.g., a selected game) based upon the primary and secondary game controllers communicating via the human body path (Step 910). Thus, the method finally includes generating a display that shows two game video elements being used by a single user, Step 912.

Referring now to FIG. 10, a method 1000 for a video game system includes determining a first user ID for a user holding a first game controller, Step 1002 and determining a second user ID for a user holding a second game controller, Step 1004. Thereafter, the method includes determining that the first and second users IDs are the same and that one person is using the first and second game controllers, Step 1006. The method optionally includes the step of operating the two game controllers as a pair for a single application or game, Step 1008. More specifically, the two controllers may be associated with one user (or player) for one game, program or application. Thus, the embodiments of the invention may also include the step of displaying games and other programs that allow a user to use at least two controllers while interacting with the games and programs, Step 1010, to allow a user to limit the selection of games, applications, programs, etc. that support single user operation of multiple controllers. Finally, the method includes the first and second game controllers communicating via a human body path of a single user and generating a display that shows two game video elements being used by a single user, Step 1012. To illustrate, if two controllers are communicating via the human body path, and the game is a boxing game, the two video elements may be two boxing gloves for a single fighter.

Referring now to FIG. 11, the method shown generally at 1100 includes the first or primary game controller receiving game data from the second controller via the human body path, Step 1102, and transmitting the received game data to a game console via a communication interface, i.e., one of a wired or wireless communication link, Step 1104. The method further includes the first (or primary) game controller receiving control commands for the secondary controller through the communication interface and transmitting the control commands to the second game controller via the human body path, Step 1106. Additionally, the method may include the first and second game controllers communicating using a personal area network protocol via the human body path, or, alternatively, the first and second game controllers communicating using a personal area network protocol via the human body path and via a wireless media. In one embodiment, the communications via the human body path are at a lower transmission power level than communications via the wireless media. Thus, the method includes a plurality of steps for minimizing the transmission power rate through the human body path. The primary controller transmits a signal quality metric/indication to the secondary controller through the human body path, Step 1108, to allow the secondary controller to adjust its transmission power level accordingly. The primary controller also receives a signal quality metric/indication transmitted by the secondary controller through the human body path, Step 1110, to allow the secondary controller to adjust its transmission power level. Finally, the method includes the primary controller adjusting the transmit power level for human body path transmissions based on one of the received signal quality metric/indication transmitted by the secondary controller through the human body path or based upon a signal quality of signals received through the human body path, Step 1112.

Figure 12:
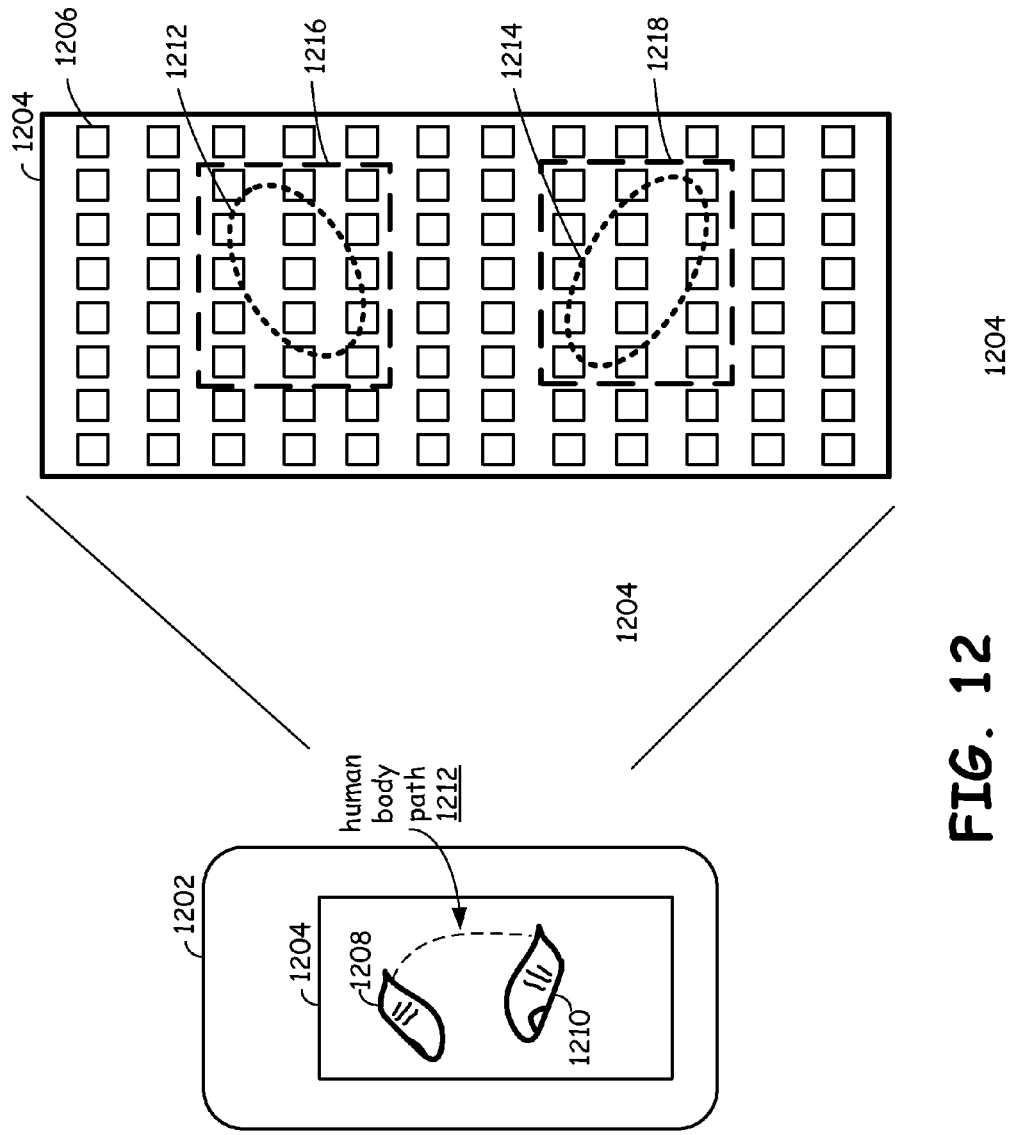
FIG. 12 is a diagram that illustrates the structure and operation of a communication device according to one embodiment of the invention.

FIG. 12 is a diagram that illustrates a touch screen of a communication or gaming device according to one embodiment of the invention. A communication device 1202 includes a display 1204 that further includes an array of touch pads 1206 that detect touch as well as transmit and receive communication signals using capacitive coupling. In the example of FIG. 12, a finger 1208 is communicatively coupled with display 1204 as is a thumb 1210. Moreover, the finger 1208 and thumb 1210 are both part of the same user's hand (not shown) to create a human body path 1212 there between the two to support human body path communications. One aspect of the embodiment of the present invention is that the wireless communication device is operable to transmit into one of the finger 1208 and thumb 1210 and to receive the transmitted signal(s) from the other of finger 1208 and thumb 1210. By transmitting in such a manner through the human body path 1212 the communication device is operable (configured) to evaluate transmission characteristics through the human body path 1212 to uniquely identify a user.

Referring to the right hand side of FIG. 12, display 1204 is shown in greater detail. Display 1204 includes an array of touch pads 1206 (or touch sensors) arranged in rows and columns. Finger 1208 and thumb 1210 create touch areas 1212 and 1214, respectively, wherein capacitive coupling is created between touch pads 1206 and finger 1208 and thumb 1210.

In the described embodiment, the touch pads 1206 are disposed on an inside of a display of communication device 1202. Stated differently, they are disposed on a side of a glass face of display 1204 that is opposite to a side that is touched by finger 1208 and thumb 1210. Alternatively, the array of touch pads or sensors may not be a part of a display and may merely be a part of a touch pad that may be used for control of and communications with the communication device. For example, if the communication device is a microwave oven with communication circuitry, the array of touch pads or sensors may be a part of a touch interface that is used to control the microwave oven. The capacitive coupling occurs, therefore, through the glass (or other material operably disposed on top of the touch pads or sensors). Further, finger 1208 and thumb 1210 are not necessarily required to touch display 1204. As long as they are proximate enough to support the capacitive coupling, touch areas 1212 and 1214 may be generated for the communications and methods described herein in relation to communication devices and game controllers.

Because one aspect of the embodiments of the present invention is human body path communications, the touch pads 1206 and associated communication circuitry are configured to generate capacitive coupling to support such operations. In one particular embodiment, touch pads as shown at 1216 are energized to relatively high voltage levels (e.g., 18 Volts peak-to-peak) to create a carrier signal for transmissions into touch area 1212 through finger 1208. Similarly, touch pads as shown at 1218 are energized to relatively high voltage levels to create a carrier signal for transmissions into touch area 1214 through thumb 1210. Moreover, different frequencies may be used for different purposes. Thus, for example, a signal may be generated across the array of touch pads having a first frequency for sensing a user's touch of the touch pad sensors and a second frequency may be used for generating a carrier signal for transmissions through the human body path. For exemplary values, the first frequency may be in the range of 500 kHz-1 MHz while the second frequency may be in the range of 10 MHz to 100 MHz. Accordingly, one aspect of the embodiments of the invention is to modulate a frequency according to a mode of operation (sensing a user's touch or communications). As yet another aspect, a plurality of frequencies may be applied across all or portions of the touch pad array to support transmissions through the human body path. Because the human body path does not always provide an optimal communication pathway, and because it is desirable to minimize transmission power levels through the human body path, one aspect may include transmitting over multiple frequencies simultaneously to enhance signal transmission effectiveness and/or signal quality. In one embodiment of the invention, the communication device is operable to iteratively transmit at a plurality of frequencies to determine an optimal frequency for transmission (or optimal frequencies). The determined frequencies are then stored. In one embodiment, they are stored in relation to a user ID for use whenever the user is using the communication device.

As another aspect of the embodiment of the invention, the voltage magnitudes applied to the touch sensors also depend upon operational mode. In a first mode of operation, e.g., a sensing mode, a first maximum voltage level is used to energize the touch pads to capacitively couple to a user to sense the user's touch. In a second mode of operation, e.g., a communication mode, a second maximum voltage level is used to energize the touch pads to capacitively couple to a user to transmit and/or receive a communication signal. For signal transmissions, in one embodiment, the second maximum voltage level is approximately 18 Volts.

Based upon the foregoing, in a first mode of operation (e.g., a sensing mode), a signal with a first frequency range and a first voltage range is applied to the touch pads or touch sensors. In a second mode of operation (e.g., a communication mode in which a signal is to be transmitted), a signal with a second frequency range and a second voltage range is applied to the touch pads or touch sensors. Generally, it is anticipated that the first mode of operation will be a default mode and that the communication device will switch into the second mode of operation to transmit a signal and will then revert to the first mode of operation. Accordingly, voltage, power, and frequency of the electromagnetic fields applied across the touch pads/sensors are modulated as a function of the mode of operation.

In the example of FIG. 12, the human body path communications are through one hand for purposes of identifying a user. If, however, the communications are through the body from one hand to another (each hand is holding a different device), then the communications may be supported by energizing either one of the touchpad's 1206 of 1216 or 1218 or both. Similarly, if a communication signal is received and device 1202 is configured to support receive operations, then the communication signals are detected and identified through capacitive coupling at one or both of touch areas 1216 and 1218. The techniques for identifying touch locations through capacitive coupling are known to those of average skill in the art and will not be elaborated upon here. Generally, however, detected capacitance, inductance, or RF characteristics of the touch pad are distinguished at touch pads 1206 of touch areas 1212 and 1214.

Figure 13:
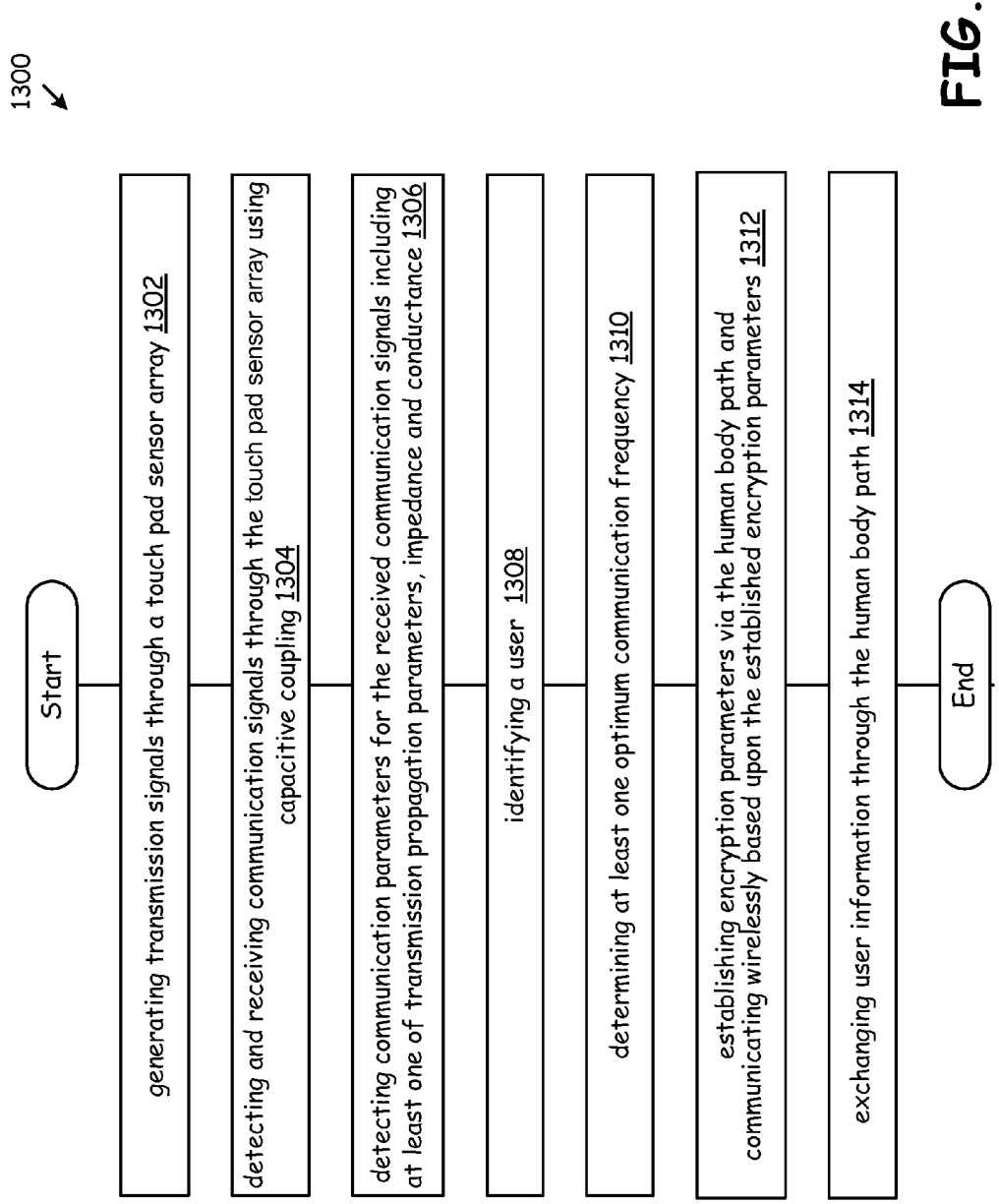
FIGS. 13 and 14 are flow charts that illustrate various aspects of a method according to one or more embodiments of the invention.

FIG. 13 is a flow chart illustrating a method for communicating according to one embodiment of the invention. The method includes generating transmission signals through a touch pad sensor array, Step 1302. The touch pad sensor array may be a part of a display system but is not required to be a part of a display system. As described in relation to FIGS. 1A and 12, as well as other places, the transmission signals are conducted from the communication device (which can be a cell phone or a game controller, for example) into the human body path using capacitive coupling. The method also includes detecting and receiving communication signals through the touch pad sensor array using capacitive coupling, Step 1304. The signals that are received may be signals transmitted by the same communication device receiving the signals (as described in relation to FIG. 12) or they may be signals transmitted by a different device. The method further includes detecting communication parameters for the received communication signals including at least one of transmission propagation parameters, impedance and conductance, Step 1306. Based upon the detected communication parameters, the method includes identifying a user, Step 1308.

One aspect of the embodiment of the invention includes determining at least one optimum communication frequency, Step 1310. The optimum communication frequency may depend, for example, upon the characteristics of the human body path including the length of the human body path. For example, a communication through the finger and thumb through a common hand is relative short and may have a different optimal communication frequency that a longer distance human body path communication. The step of determining the optimum communication frequency may include an interactive process in which transmission signal quality metrics, such as bit error rates, are evaluated as described previously. The method includes establishing encryption parameters via the human body path and communicating wirelessly based upon the established encryption parameters, Step 1312. This step can include, for example, transmitting a pre-shared encryption key from one device to another through the human body path. Alternatively, a pairing procedure similar to a Bluetooth pairing procedure may occur through the human body path to support subsequent secure wireless communications through the human body path. Finally, the method includes exchanging user information through the human body path, Step 1314. This step includes, for example, two users each holding a cell phone and shaking hands and the two cell phones communicating through a human body path that includes the bodies of both users to exchange contact information. Along these lines, the two devices establish a communication link through the human body path and then exchange user contact information such as, for example, so called "v-card" information.

Figure 14:
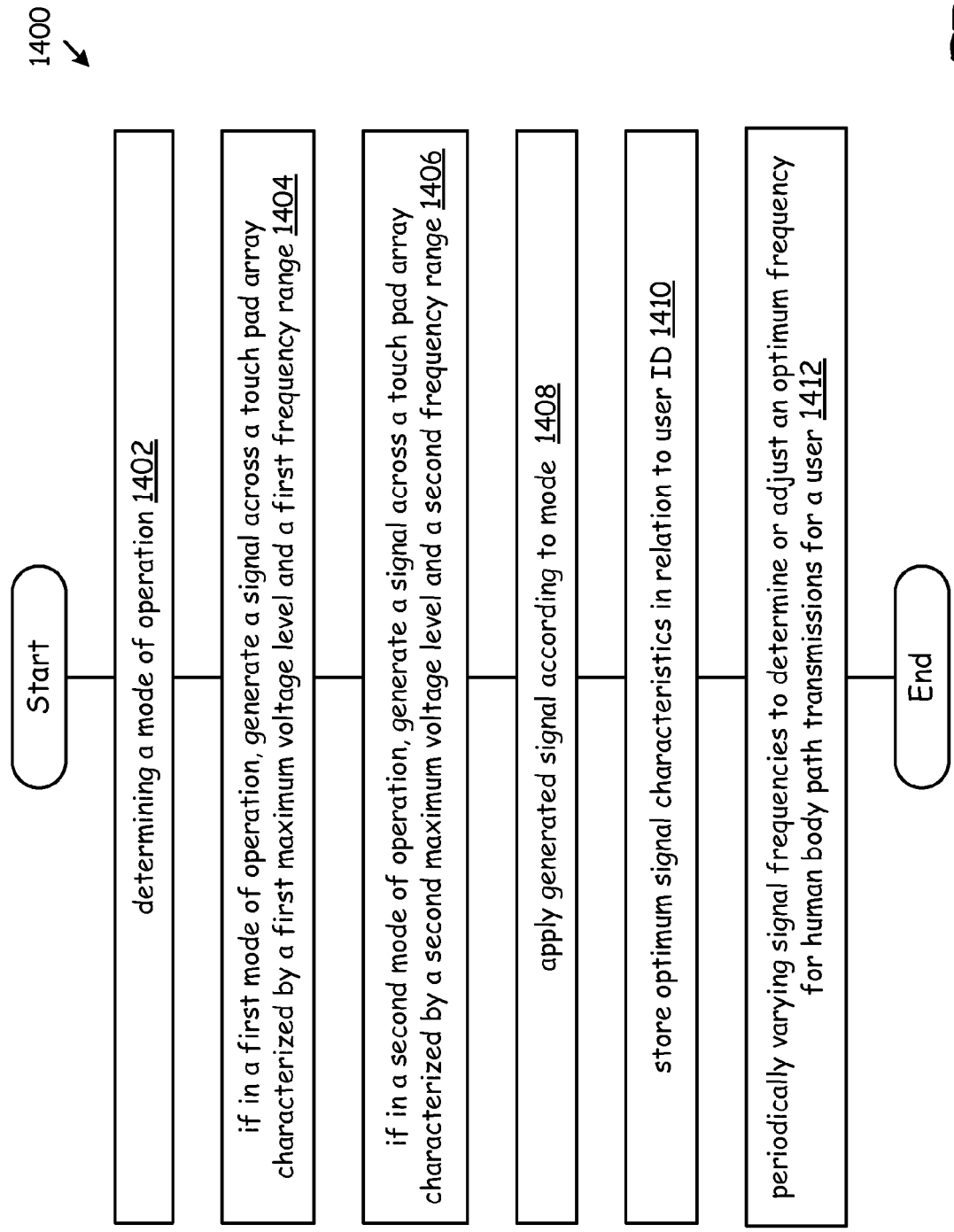

FIG. 14 is a flow chart illustrating a method according to one embodiment of the invention. The method includes initially determining a mode of operation, Step 1402. The modes of operation include, for example, a sensing mode to sense a user's touch, and a transmission mode of operation in which the touch pad array is energized to transmit a signal. Thereafter, the method includes if in a first mode of operation, generating a signal across a touch pad array characterized by a first maximum voltage level and a first frequency range, Step 1404. Similarly, the method includes if in a second mode of operation, generating a signal across a touch pad array characterized by a second maximum voltage level and a second frequency range, Step 1406. Thereafter, the generated signal is applied according to the mode of operation, Step 1408. Additionally, the method includes storing optimum signal characteristics in relation to user ID, Step 1410. Finally, the method includes periodically varying signal frequencies to determine or adjust an optimum frequency for human body path transmissions for a user, Step 1412.

The above operations described in relation to cell phones or other communication devices may be applied to game controller operations and vice-versa. Thus, many of the operations described above in relation to the gaming devices and controllers may be applied to cell phones with little or no modification. Such operations include but are not limited to associated steps for establishing a communication link through the human body path, exchanging or transmitting data, determining preferred or optimum signal quality parameters including transmission power levels and frequencies using feedback loops or bit error processing techniques, etc.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output (s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A communication device, comprising:
   a communication interface for communicating over one of a wired or wireless communication medium;
   intra-body communication circuitry that is operable to transmit and receive human body path communication signals via a human body path;
   processing circuitry coupled to the communication interface and to the intra-body communication circuitry;

a touch sensor array coupled to the intra-body communication circuitry for transmitting and receiving the communication signals via the human body path using capacitive coupling;

wherein:

while operating in a touch sensing mode, the communication device energizes at least a portion of the touch sensor array with a first signal characterized by a first voltage magnitude; and while operating in a communication mode, the communication device energizes at least a portion of the touch sensor array with a second signal characterized by a second voltage magnitude.

2. The communication device of claim 1 configured to transmit and receive the human body path communication signals and to detect communication parameters of the human body path including at least one of transmission propagation parameters, impedance, and conductance.

3. The communication device of claim 2 configured to identify a user based upon the detected communication parameters.

4. The communication device of claim 2 configured to determine at least one optimum communication frequency for the human body path.

5. The communication device of claim 4 configured to identify a user based upon the determined at least one optimum frequency.

6. The communication device of claim 2 configured to transmit the human body path communication signals through a first one of a finger or thumb and to receive the human body path communication signals from a second one of the finger or thumb.

7. The communication device of claim 2 configured to establish encryption parameters via the human body path.

8. The communication device of claim 2 configured to communicate wirelessly based upon the established encryption parameters.

9. The communication device of claim 2 configured to exchange user contact information via the human body path.

10. The communication device of claim 1 comprises a game controller of a video game system.

11. The communication device of claim 1 wherein the communication device includes a display and wherein the touch sensor array is a part of the display.

12. The communication device of claim 1 wherein the communication device wherein the first and second signals are characterized by first and second frequency ranges, respectively.

13. A communication system comprising:

a first communication device configured to communicate via a wired or wireless first communications link and a second communications link;

a second communication device communicatively coupled to the first communication device through the second communications link; and wherein the second communications device includes at least one touch pad operable to transmit and receive human body path communication signals through a human body path.

14. The communication system of claim 13, wherein the human body path includes at least one specified communication parameter of: transmission propagation, impedance and conductance.

15. The communication system of claim 13 further comprising a game console communicatively coupled to the first communication device through the first communications link.

16. The communication system of claim 15, wherein the first communication device and the second communication device are game controllers of the game console.

17. A communication method comprising:

communicating between a game console and a first game controller via a first communications link;

communicating between the first game controller and a second game controller via a second communications link; the second communications link configured to communicate via a human body path;

transmitting communication signals from the first game controller to the game console; and wherein the transmitted communication signals are received by the first game controller from the second game controller via the human body path.

18. The communication method of claim 17 further comprising enabling the first game controller and the second game controller to operate as a pair.

19. The communication method of claim 17 further comprising identifying a person holding at least one of the first game controller or the second game controller and supporting secure communication.

20. The communication method of claim 17, wherein the person holding the at least one of the first game controller or the second game controller is identified using specified communication parameters of the human body path including at least one of transmission propagation, impedance and conductance.

* * * * *

UNITED STATES PATENT AND TRADEMARK OFFICE
CERTIFICATE OF CORRECTION

PATENT NO. : 8,838,060 B2  
APPLICATION NO. : 12/943768  
DATED : September 16, 2014  
INVENTOR(S) : Walley et al.

It is certified that error appears in the above-identified patent and that said Letters Patent is hereby corrected as shown below:

In the claims

Col. 21, lines 45-46, Claim 12: after "device of claim 1" delete "wherein the communication device"

Signed and Sealed this
Twenty-third Day of February, 2016

Michelle K. Lee
*Director of the United States Patent and Trademark Office*